Dec. 7, 1926.
B. MOHN
1,609,489
LUGGAGE CARRIER AND BED
Filed July 30, 1925     2 Sheets-Sheet 1
Fig. 1.
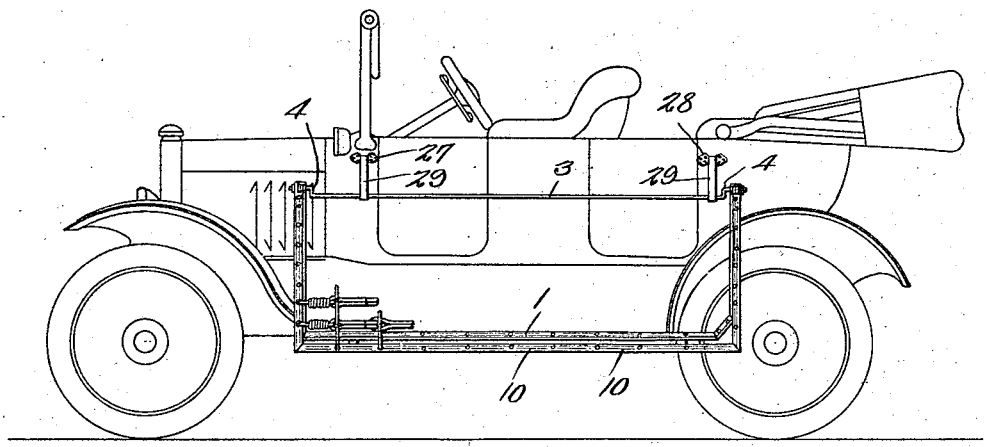
Fig. 3.
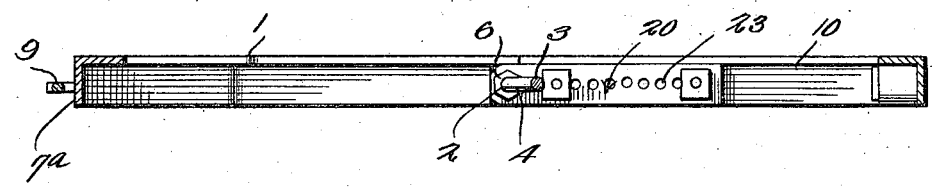
Fig. 4.
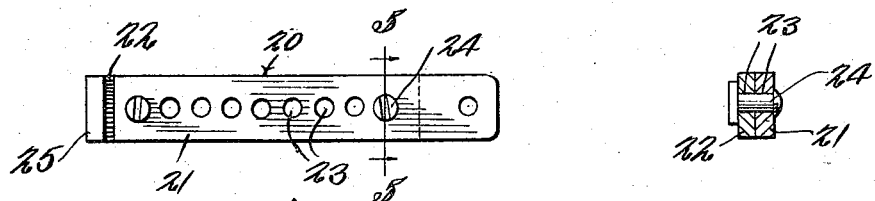
Fig. 5.
Inventor
Blaine Mohn
By C. A. Snow & Co.
Attorneys.

Dec. 7, 1926.
B. MOHN
1,609,489
LUGGAGE CARRIER AND BED
Filed July 30, 1925    2 Sheets-Sheet 2
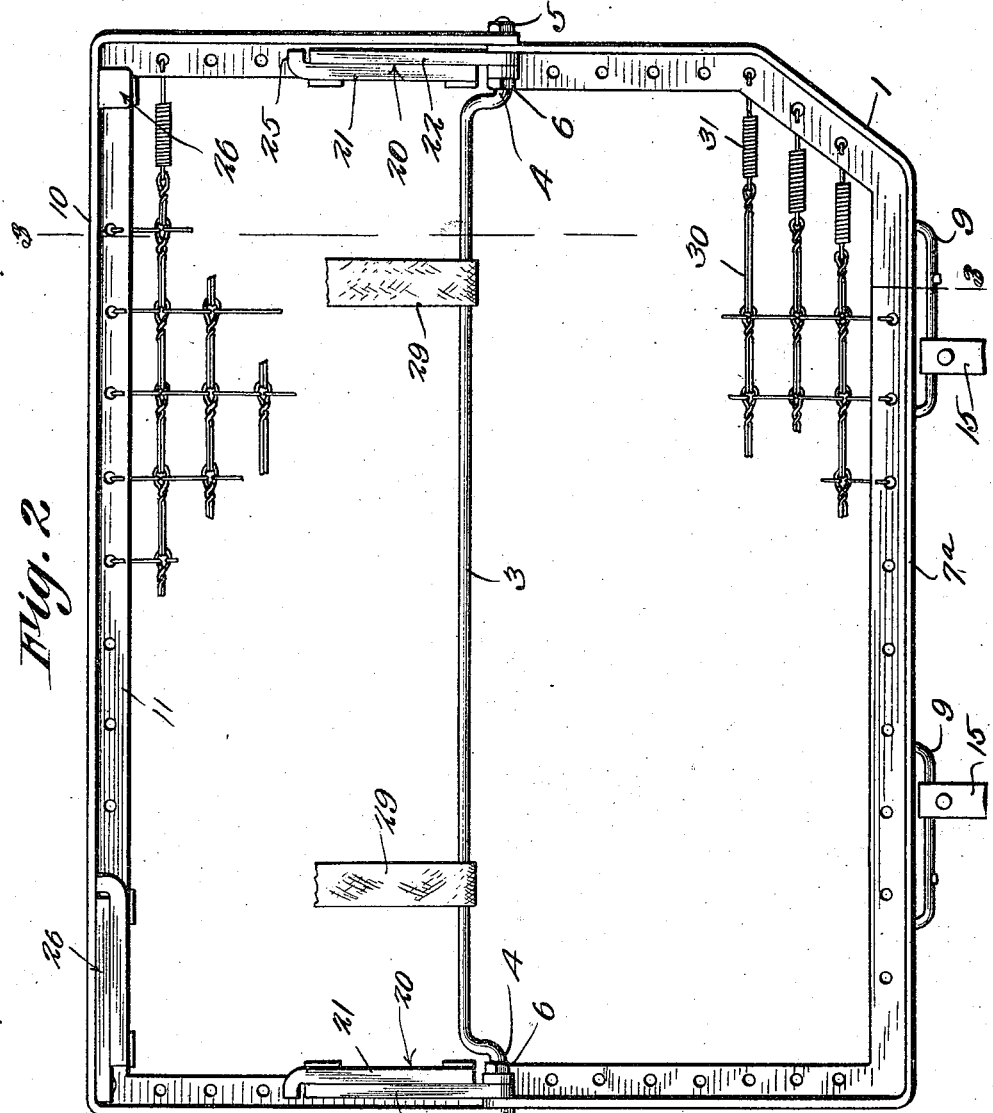
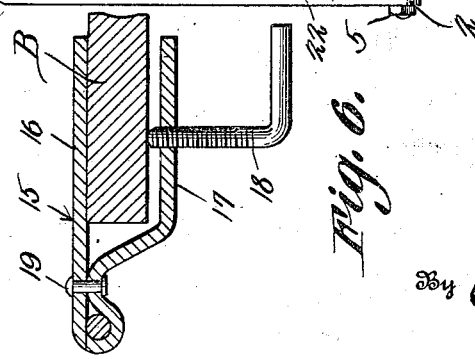
Inventor
Blaine Mohn
By C. A. Snow & Co.
Attorneys Patented Dec. 7, 1926.

1,609,489

UNITED STATES PATENT OFFICE.

BLAINE MOHN, OF CLYDE, OHIO.

LUGGAGE CARRIER AND BED.

Application filed July 30, 1925. Serial No. 47,085.

This invention relates to a combination luggage carrier and bed for automobiles.

The object of the invention is to provide a combined luggage carrier and bed adapted to be mounted on the running board of an automobile which when extended forms a comfortable bed for two people and when closed forms a luggage carrier and presents a neat attractive appearance.

Another object is to so construct a device of this character that it may be readily removed from the running board when desired so that when the car is not used for touring purposes this device may be stored away and applied when desired.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of an automobile with this improved combination luggage carrier and bed shown applied and in position for use as a carrier;

Fig. 2 is a bottom plan view of the device opened up ready for use as a bed with parts broken out for convenience in illustration;

Fig. 3 is a transverse section taken on the line 3—3 of Fig. 2;

Fig. 4 is a side elevation of one of the folding legs detached;

Fig. 5 is a transverse section taken on the line 5—5 of Fig. 4; and

Fig. 6 is a detail sectional view taken on the line 6—6 of Fig. 2.

The combination bed-carrier comprises two sections 1 and 10 hingedly connected at 2 by a rod 3 which extends longitudinally of the sections and has its ends offset as shown at 4, said offset ends being threaded and passed through the lapping ends of the section frames and secured by nuts 5 and 6 and which also support extensionable legs 20.

The frames of the sections 1 and 10 are preferably made of angle iron, the upper flanges of section 10 being cut away to receive the end of the frame of section 1 through the outer flange of which passes the rod end 4, said end passing also through the projecting flange portion of the frame section 10.

The legs 20 are composed of two sections 21 and 22 superposed on each other and adapted to be adjusted longitudinally relatively to each other to vary the length of the legs. These sections 21 and 22 are provided with a plurality of bolt receiving apertures 23 as shown in Fig. 4 the apertures of one section registering with those of the other and designed to receive bolts 24 two of which are here shown and which hold the sections in adjusted position. The outer section 21 is provided at its outer end with a laterally extending foot 25 designed to engage the supporting surface when the device is opened up for use as a bed.

Legs 26 similar in construction to the legs 20 are pivotally mounted at the outer corners of section 10 and when not in use are designed to be folded flat against the inner face of the upper or lateral flange 11 of the frame section. In Fig. 2 one of these legs is shown folded in inoperative position at the left hand corner of the frame while the other is shown open for use to support said frame.

Section 1 which is designed to be clamped to the running board B of the automobile has keepers or guide rods 9 fixed to the outer face of the depending flange 7$^a$ of the side member of the frame 7' and with which are slidably engaged the clamps 15. These clamps 15 are exactly alike and hence one only will be described in detail.

Each clamp as shown in Fig. 6 comprises a rectilinear jaw 16 in the form of a metal strap designed to be arranged transversely of the running board on the upper face thereof while the cooperating jaw 17 which passes under the running board is offset from the portion which is connected with jaw 16 and through which passes a clamping screw 18 between the inner end of which and the jaw 16 the running board is clamped.

The inner end of the jaws 16 and 17 are provided with hook-shaped terminals designed to hook around the rod 9 when the clamp is assembled and to form bearings which completely surround said rod and which are adapted to swing laterally and slide longitudinally on the rod. These jaws as shown are pivotally connected adjacent the rod at 19.

Hangers 27 and 28 are secured to the sides of the car body at the front and rear thereof as shown clearly in Fig. 1 adjacent the upper portion of the body and are designed to receive straps or suspension elements 29 which are looped around the rod 3 and designed to hold the device in upright position when used as a carrier, said straps performing the function of braces for the carrier.

In the use of this combined bed and carrier section 1 is connected with the running board by the clamps 15 as above described and when used as a carrier the sections are folded one on the other as shown in Fig. 1 with the section 1 disposed inwardly and section 10 outwardly, the folding legs being arranged flat against the horizontal flanges of the section. After being so positioned the straps 29 are engaged with the keepers 27 and 28.

When the device is to be used as a bed the parts being in the position shown in Fig. 1 the straps 29 are disengaged from the keepers 27 and 28 and the sections opened out and swung downwardly into horizontal position with the legs 20 and 26 depending to engage the ground and thereby support the bed in open operative position ready for use.

It is of course understood that suitable springs are provided for this frame section, those here shown being in the form of loosely connected links 30 with coiled springs 31 connecting the ends of said links with the frame as is usual in the springs of this character.

The sliding connection of the clamps 15 with the guide rods 9 provide for the longitudinal movement of the bed to bring it under an automobile tent if desired to do so.

Adjacent the tie rod 3 at the inner end of section 1 are arranged two lengthwise wires 32 and 33 disposed about one inch apart more or less to provide a double hinge in the spring near the bending point.

I claim:—

A device of the class described comprising two sections, means for mounting one section at its outer edge upon the running board of a vehicle for vertical swinging movement and for sliding movement longitudinally of the vehicle, suspension elements on the vehicle, and a rod connecting the inner edges of the sections, at their ends; the rod exercising three functions, in that it forms a pivotal connection between the sections whereby when said one section is turned up, the other section may be turned down to form a luggage carrier, in that it constitutes a continuous top rail when the sections form a luggage carrier as aforesaid, and in that it is connected to the suspension elements thereby to hold the sections in position to form a luggage carrier; the device being further characterized by the fact that the suspension elements are spaced apart by a distance less than the length of the rod, thereby permitting the device to be shifted lengthwise of the vehicle whilst the suspension elements are engaged with the rod.

In testimony that I claim the foregoing as my own, I have hereto affixed my signature.

BLAINE MOHN.